May 25, 1937.                A. G. H. CARLBOM                2,081,660
                LEVERAGE CHANGING MECHANISM FOR VEHICLE BRAKES
                    Filed Nov. 8, 1934            3 Sheets-Sheet 1
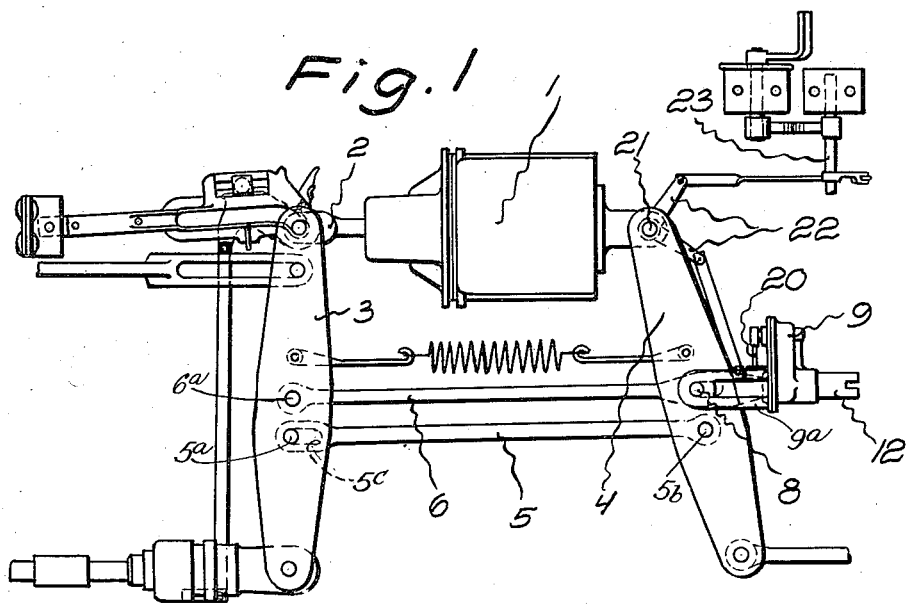
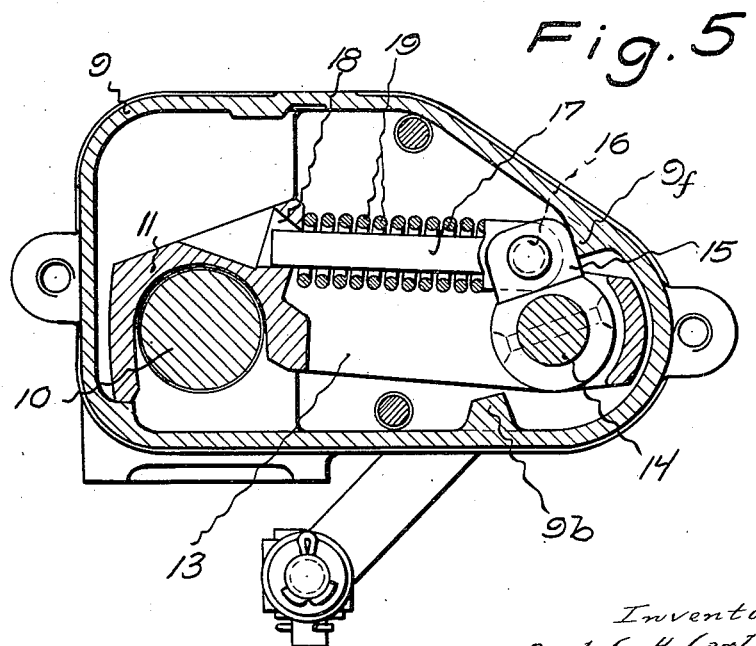
Inventor:
Axel G. H. Carlbom
By
Attorney May 25, 1937.  A. G. H. CARLBOM  2,081,660
LEVERAGE CHANGING MECHANISM FOR VEHICLE BRAKES
Filed Nov. 8, 1934  3 Sheets-Sheet 2
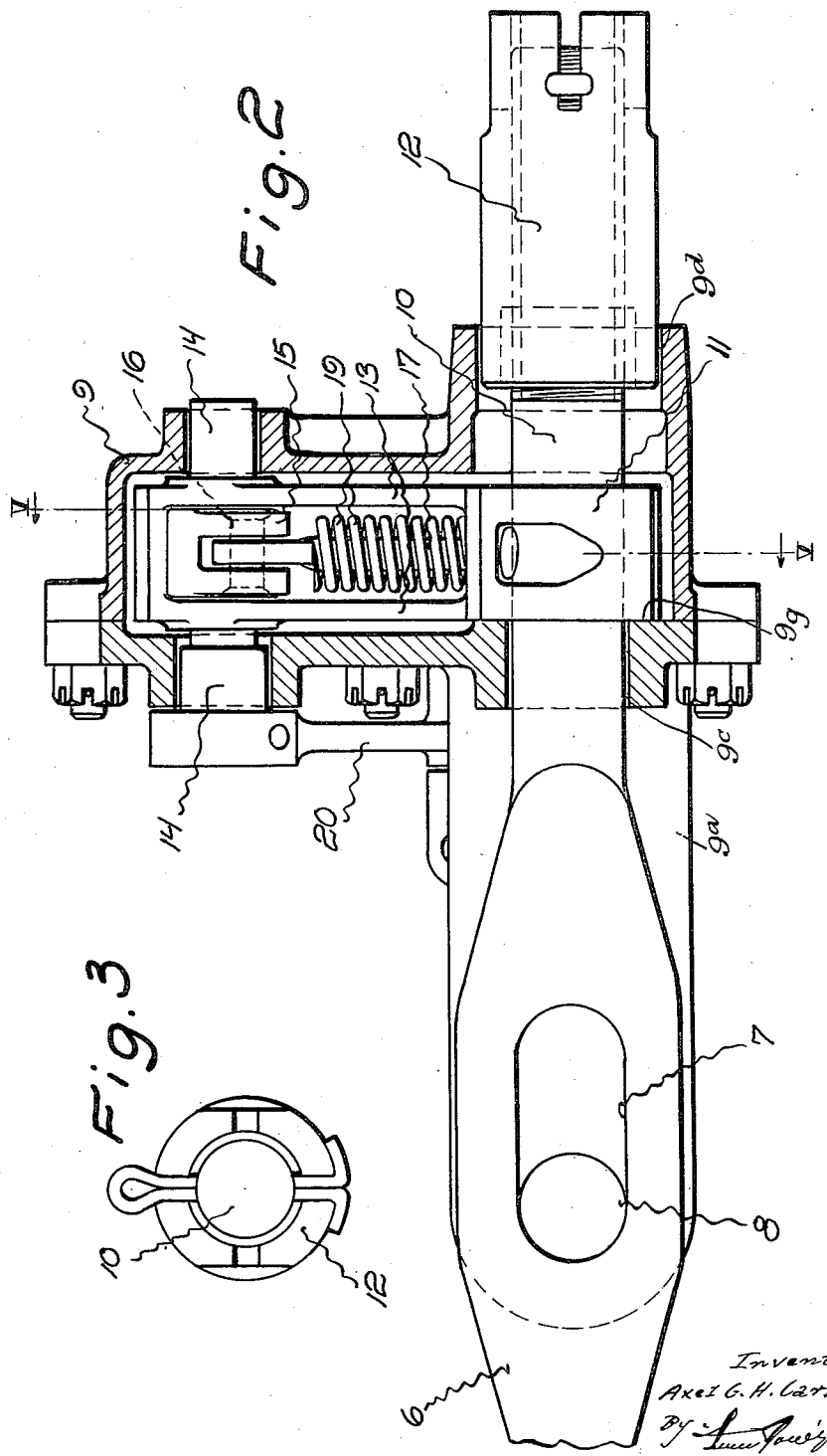
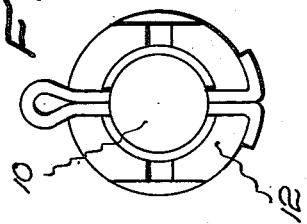
Inventor:
Axel G. H. Carlbom
By *Attorney*

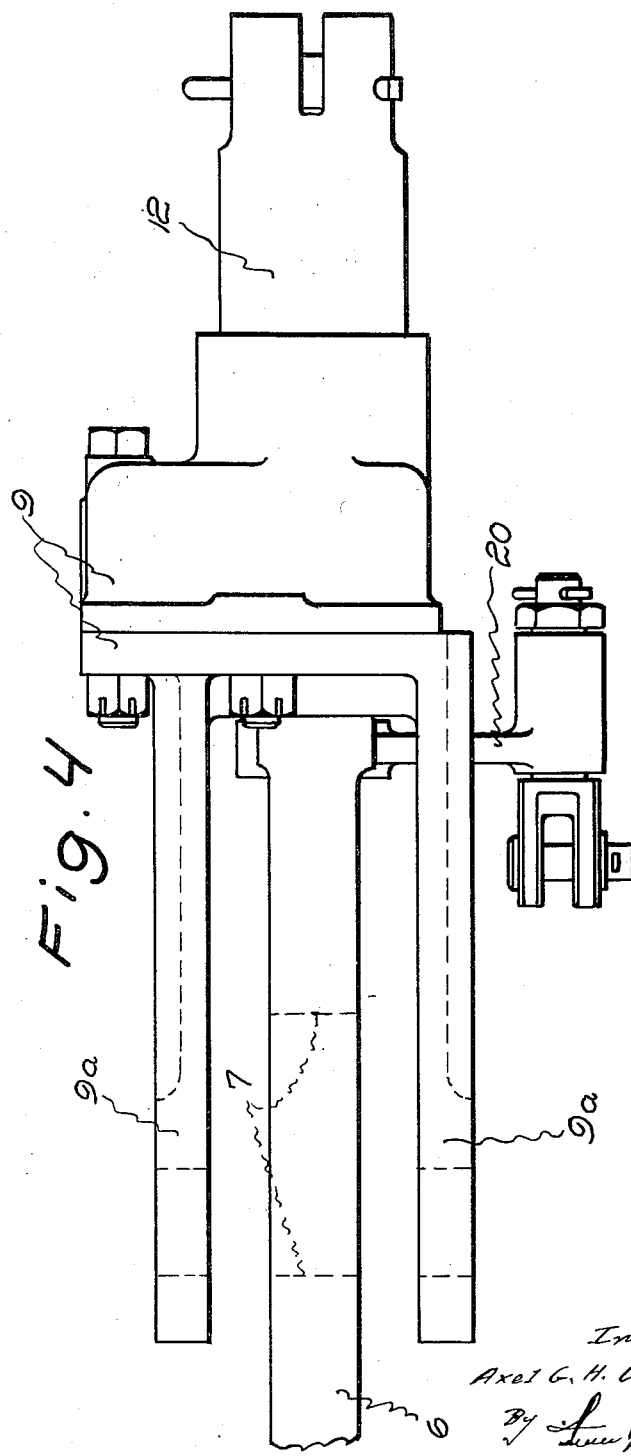

Patented May 25, 1937

2,081,660

UNITED STATES PATENT OFFICE 2,081,660

LEVERAGE CHANGING MECHANISM FOR VEHICLE BRAKES

Axel Georg Hjalmar Carlbom, Malmo, Sweden, assignor to Svenska Aktiebolaget Bromsregulator, Malmo, Sweden, a Swedish company Application November 8, 1934, Serial No. 752,167 In Germany November 16, 1933

17 Claims.  (Cl. 188—195)

The invention refers to vehicle brakes and especially to railway car brakes in which the brake levers are constructed for a step-wise variable leverage for adjusting the braking power according to the load on the car, and wherein the variation of the said leverage is performed by the engagement or disengagement of a number of links connected with the brake levers at different points of the length of the latter.

The invention has for its main object to provide a simple, efficient and reliable means for the engagement and disengagement of the different connection links, such means for the sake of simplicity being termed a "leverage changing mechanism". The advantages of the construction result from the small space required for the mounting, in the easiness of adjustment of the dead motion required for the function, and in the elimination of stresses on the bearings and shiftable members of the leverage changing mechanism.

A preferred embodiment of the invention is illustrated in the accompanying drawings in which:—

Fig. 1 is drawn to a smaller scale than the other figures and shows a plan view of the brake structure in order to illustrate the mounting of the leverage changing mechanism therein, Fig. 2 is a plan view of the leverage changing mechanism seen in horizontal section through the housing, Fig. 3 is an end view of the connection link seen from the right in Fig. 2, Fig. 4 is an elevation of the housing of the leverage changing mechanism, and Fig. 5 is a section at the line V—V in Fig. 2.

Referring to the drawings, and at first especially to Fig. 1, 1 is the brake cylinder, 2 is the piston rod connected with the piston which is reciprocably mounted in said cylinder, 3 is the main brake lever, or so called "live" lever, connected with said piston rod 2, and 4 is the fixed point lever, or so called floating lever. By means of the two connection links 5 and 6, the said two brake levers are connected at different points of their length, and said connection links are mounted so as to have a certain amount of lost motion. The connection link 5 is used for the higher leverage, and the connection link 6 for the lower leverage, which latter, is brought into action by means of the engagement of a shiftable abutment block by means of which the amount of lost motion of the connection link 6 is reduced. In the embodiment of invention shown, the connection link 6 is provided with a slot 7 (Fig. 2) for the bolt 8 which connects the lever 4 therewith. Slot 7 provides for lost motion between the movement of link 6 and the lever 4. A housing 9 is pivotally connected with the lever 4 by means of the same bolt 8 which cooperates with a pair of lugs 9a extending from said housing.

An extension 10 of the connection link 6 is mounted slidably in its direction of length through the housing 9 and passes through apertures 9c, 9d therein so that said housing is guided in the longitudinal direction of said link. A tiltable abutment block 11 is mounted within the housing 9 and adapted to coact with a corresponding abutment provided on the extension 10 of the connection link 6. In the embodiment of invention shown, this last mentioned abutment is constructed in the shape of a nut member 12 adjustably screwed on to the threaded end of the link extension 10. Fig. 3 shows an end view of said nut. The abutment block 11 is supported by an arm 13 freely rotatably mounted on a shaft 14 positioned substantially parallel to the link extension 10 and mounted rotatably in the housing 9. The said shaft 14 is rigidly connected with a crank arm 15, and a rod 17 is pivotally connected with said crank arm by means of a pin 16, said rod 17 being slidable through an aperture 18 in the abutment block 11 and surrounded by a compression coil spring 19. The tilting movement of the crank arm 15 is limited by fixed abutments 9b and 9f within the housing 9, and the aperture 18 is of a tapering shape so as to prevent the jamming of the rod 17 therein.

By means of an exterior crank arm 20 rigidly connected with the shaft 14, the said shaft is connected with a link and lever system including a bell crank lever 22 pivotally mounted on the stationary pivot pin 21 of the brake lever 4, said link and lever system connecting the shaft 14 with a rocker shaft 23 belonging to the leverage shifting mechanism and provided, in a known manner, with handle members mounted at opposite sides of the car for the purpose of manipulation.

In case the shaft 23 is rocked into a position for braking by means of the higher leverage, the crank arm 15 is swung into such a position (against the lower abutment 9b in Fig. 5) that the spring has a tendency to tilt the arm 13 and the abutment block 11 (upwards in Fig. 5) out of the path of movement of the abutment 12 on the link extension 10, and if the shaft 23 is rocked into position for braking by means of the lower leverage, the crank 15 is swung into the position shown, in which the spring 19 has a tendency to tilt the arm 13 and the abutment block 11 into the path of movement of the abutment 12 on the link extension. In a manner known per se, the apparatus is constructed in such a way that the rocking of the shaft 23 can take place even when the brake is set, in which case the actual tilting of the abutment block 11 takes place as soon as such movement is permitted by release of the brake. In a manner known per se, the apparatus is also constructed in such a way that the spring 19 acts to arrest the mechanism in both of the end positions of the abutment block 11.

Briefly summarized, the operation of the device is as follows:

When the car is loaded and, consequently, a higher braking pressure is required, that is, when it is desired to brake by the intermediary of the connection link 5 producing the higher leverage ratio, the crank arm 15 is set in the position in which it abuts the lower abutment 9b so that the spring 19 moves the movable abutment block 11 in inactive position, that is out of the path of the abutment nut 12. When applying the brakes, the connection link 6 will then slide idly in relation to the bolt 8 and, consequently, the connection link 5 will transmit the braking force.

When the car is empty, a lower braking pressure is required, and for this purpose the connection link 6 producing the lower leverage ratio is made operative by setting the crank arm 15 in the position in which it abuts the upper abutment 9f so that the spring 19 moves the abutment block 11 in active position, that is, in the path of the abutment nut 12 (Fig. 5). When in this position, the abutment block 11 reduces the lost motion of the link 6 in relation to the bolt 8 so that, when applying the brakes, the nut 12 abuts the abutment block 11, whereby the link 6 is supported from the bolt 8 and thus is rendered operative. From the moment the nut 12 abuts the block 11, the levers 3 and 4 will turn about the connection bolts 6a and 8 (Fig. 1) respectively and, consequently, the bolts 5a and 5b connecting the link 5 to the levers 3 and 4 will move towards each other. In order to allow for this relative movement, a slot 5c is provided in the link 5 for one of the bolts 5a, 5b so that the link 5 slides idly in relation to this bolt and thus is inoperative.

As shown in Fig. 2, there may be a certain axial clearance between the nut 12 and the block 11 in the released position of the brakes. Preferably this clearance is adjusted to such a value that the nut 12 abuts the block 11 substantially at the same moment at which the brake shoes abut the wheels when applying the brakes, the purpose thereof being to obtain substantially the same application stroke of the brake piston when braking on the lower leverage ratio as when braking on the higher leverage ratio.

When the nut 12 abuts the block 11, the latter is supported directly by the supporting surface 9g (Fig. 2) provided for the purpose in the housing 9, whereby the shaft and bearings for the block 11 in the housing 9 will not be subjected to the braking stresses arising in the link rod 6.

The advantages gained by the apparatus described are to be found in the simplicity of construction and the reliability in function besides whereof the apparatus requires so small a space only that it may be mounted in brake riggings already at hand with the smallest possible changes thereof. The simplicity of construction makes the apparatus cheap in manufacture. A further advantage is that the braking power, when braking with the lower leverage by the intermediary of the engageable and disengageable abutment block 11, is transmitted directly in the longitudinal axis of the connection link 6, without causing any stresses on the bearings and shifting means for the abutment block. The abutment 12 on the connection link 6 is easily adjustable without demounting the apparatus, for instance for adjustment of the amount of dead motion of the said link to the most suitable value for each specific instance. Due to the small space required for the mounting of the apparatus, the points of connection of the different connection links between the brake levers may be positioned rather close together, which is desirable in many instances.

What I claim and desire to secure by Letters Patent is:

1. In a vehicle brake of the character described, a brake lever, means for performing a movement of said lever for the purpose of applying and releasing the brake, a number of connection links adapted to coact with said brake lever at different points of its length, means adapted to permit a certain maximum amount of lost sliding motion of one of said connection links in relation to the brake lever in the direction of length of the connection link, means for reducing the maximum amount of said lost sliding motion, such reducing means being adapted to be cut into or out of action at will, a housing surrounding said reducing means and hingedly mounted on the brake lever, an extension of the aforesaid one connection link slidably mounted in the housing, guiding means provided in the housing for said link extension and adapted to keep the housing in its position, and an abutment means provided on the link extension and adapted to coact with the aforesaid reducing means for limiting the amount of lost motion.

2. In a vehicle brake according to claim 1, the additional feature that the abutment means provided on the link extension is adjustably mounted on said extension in the direction of length of the same.

3. In a vehicle brake according to claim 1, the additional feature that the abutment means provided on the link extension consists of a nut member screwed on to the threaded end portion of said extension and mounted so as to be accessible from the exterior of the housing.

4. In a vehicle brake of the character described, a live brake lever, a floating brake lever pivoted on a stationary bolt, means for performing a movement of said levers in relation to each other for the purpose of applying and releasing the brake, a connection link hingedly connected at its opposite ends with each of the brake levers and adapted to perform a braking with a relatively higher leverage, a second connection link, pivot pins hingedly connecting said second connection link at its opposite ends with each of the brake levers at points positioned at a distance from the connection points of the first mentioned connection link in the direction of length of the brake levers, said second connection link being adapted to perform a braking with a relatively lower leverage, means adapted to permit a certain maximum amount of lost motion of the second mentioned connection link in relation to one of the brake levers in the direction of length of the link, shiftable abutment means adapted for reduction of the amount of said lost motion, means for cutting in and out said abutment means, a housing surrounding said abutment means and hingedly mounted on the pivot pin hingedly connecting the floating brake lever and the second connection link, an extension of the second connection link slidably mounted in the housing and extending therethrough, guiding means provided in the housing for said link extension and adapted to keep the housing in its position, and a second abutment means provided on the link extension and adapted to coact with the first mentioned abutment means for limiting of the amount of lost motion of the connection link.

5. In a vehicle brake according to claim 4, the additional feature that the second abutment means provided on the link extension is adjustably mounted on said extension in the direction of length of the same.

6. In a vehicle brake according to claim 4, the additional feature that the second abutment means provided on the link extension consists of a nut member screwed on to the threaded end portion of said extension and mounted so as to be accessible from the exterior of the housing.

7. In a vehicle brake according to claim 4, the additional feature that the shiftable abutment means mounted within the housing is supported by an arm tiltably mounted on a shaft positioned parallel with the link extension.

8. In a vehicle brake according to claim 4, the additional features, that the shiftable abutment means mounted in the housing is supported by an arm tiltably mounted on a shaft positioned parallel with the link extension, and that said abutment means is adapted to coact with the second abutment means which is in the shape of a nut member screwed on to the threaded end portion of said link extension.

9. In a vehicle brake according to claim 4, the additional features that the lost motion is provided for in connection with the floating lever, that the shiftable abutment means mounted within the housing is supported by an arm tiltably mounted on a shaft positioned parallel with the link extension, that said shaft is provided with means for shifting the said abutment means into and out of activity, and that said shaft is connected with a rocker shaft by means of a link and lever system including a bell crank lever pivotally mounted on the stationary pivot bolt of the floating brake lever.

10. A brake rod coupler, comprising a housing having an axial extension at one end, a rod axially slidable through said housing and guided in the opposite end wall thereof, said rod having an end portion projecting into the extension of the housing, an abutment on said projecting end portion of said rod, an abutment member movable in said housing transversely to said rod in and out of an active position, said movable abutment member having a portion which in the active position of said member lies in the path of the abutment on the rod, and means for selectively setting the said movable abutment member in and out of the active position.

11. A brake rod coupler as claimed in claim 10, in which the means for setting the movable abutment member in and out of active position includes a shaft journaled in said casing parallel to said rod and adapted to be set in either of two angular positions, and in which the said transversely movable abutment member is carried by arms rotatably mounted on said shaft, and is connected to an arm which is secured on said shaft, by means of a spring device which in one of the said angular positions of the shaft tends to move and retain the movable abutment in active position and in the other of said angular positions of the shaft tends to move and retain the movable abutment member in inactive position.

12. A brake rod coupler comprising a housing, a rod axially slidable through said housing and guided in one end wall thereof, said rod having an end portion projecting through an opening in the opposite end wall of the housing, an abutment on the said projecting end portion of said rod and adapted to move with said rod into and out of said housing through said opening, an abutment member movable in said housing transversely to said rod in and out of an active position in which the said movable abutment member lies in the path of the abutment on the rod, and means for selectively setting the said movable abutment member in and out of the active position.

13. A brake rod coupler comprising a housing having an extension at one end, a rod axially slidable through said housing and guided therein, said rod having an end portion projecting through the opposite end wall of said housing, an abutment on said projecting end portion of said rod, an abutment member movable in said housing transversely to said rod in and out of an active position in which the said movable abutment member lies in the path of the abutment on the rod, and means for selectively setting the said movable abutment member in and out of the active position.

14. A brake rod coupler as set forth in claim 12, in which the means for setting the movable abutment member in and out of active position includes a shaft journaled in said housing parallel to said rod and adapted to be set in either of two angular positions, and in which the said transversely movable abutment member is carried on arms rotatably mounted on said shaft and is connected to an arm which is secured on said shaft by means of a spring device which, in one of the said angular positions of the shaft, tends to move and retain the movable abutment member in active position and in the other of said angular positions of the shaft tends to move and retain the movable abutment member in inactive position.

15. A brake rod coupler as set forth in claim 13, in which the extension on the housing comprises a pair of lugs which extend from the housing on opposite sides of the rod and are provided at their free ends with aligned holes for a bolt for hingedly connecting the housing and the rod to a brake lever, the rod having a long hole for said bolt.

16. A brake rod coupler as set forth in claim 12, in which the abutment on the projecting end of the rod comprises an adjustable nut screwed on the said projecting end.

17. A brake rod coupler as set forth in claim 12, in which the said transversely movable abutment member is carried on arms rotatably mounted on a shaft journaled in said housing parallel to said rod and is connected to an arm which is secured on said shaft by means of a spring device comprising a stem pivoted to said last-mentioned arm and guided in a hole in said transversely movable abutment member, and a coiled compression spring mounted on said stem and bearing against the said transversely movable abutment member and a head at the pivoted end of the said stem.

AXEL GEORG HJALMAR CARLBOM.